(12) United States Patent
Chou et al.

(10) Patent No.: US 10,333,771 B2
(45) Date of Patent: Jun. 25, 2019

(54) DIAGNOSTIC MONITORING TECHNIQUES FOR SERVER SYSTEMS

(71) Applicant: Quanta Computer Inc., Taoyuan (TW)

(72) Inventors: Le-Sheng Chou, Taoyuan (TW); Sz-Chin Shih, Taoyuan (TW)

(73) Assignee: QUANTA COMPUTER INC., Taoyuan (TW)

( * ) Notice: Subject to any disclaimer, the term of this patent is extended or adjusted under 35 U.S.C. 154(b) by 852 days.

(21) Appl. No.: 14/883,161

(22) Filed: Oct. 14, 2015

(65) Prior Publication Data

US 2017/0111215 A1 Apr. 20, 2017

(51) Int. Cl.
*H04L 12/24* (2006.01)

(52) U.S. Cl.
CPC ...... *H04L 41/0618* (2013.01); *H04L 41/0672* (2013.01)

(58) Field of Classification Search
CPC .......... H04L 41/0618; H04L 41/0672
See application file for complete search history.

(56) References Cited

U.S. PATENT DOCUMENTS

| | | | |
|---|---|---|---|
| 2013/0010787 A1* | 1/2013 | Chou | H05K 7/1498 370/389 |
| 2013/0138804 A1* | 5/2013 | Hsien | H04L 12/6418 709/224 |
| 2014/0122910 A1* | 5/2014 | Chiu | G06F 1/3206 713/323 |
| 2014/0277807 A1 | 9/2014 | Mick et al. | |
| 2015/0232273 A1 | 8/2015 | Jau et al. | |
| 2016/0072642 A1* | 3/2016 | Shih | H04L 12/4666 370/392 |
| 2016/0239370 A1* | 8/2016 | Chen | G06F 11/0793 |

FOREIGN PATENT DOCUMENTS

| | | |
|---|---|---|
| CN | 103793238 A | 5/2014 |
| CN | 103853636 A | 6/2014 |
| CN | 104850118 A | 8/2015 |
| TW | 201325137 A | 6/2013 |
| TW | 201432440 A | 8/2014 |

OTHER PUBLICATIONS

Taiwanese Office Action for Application No. 104144170, dated Apr. 20, 2017, w/ First Office Action Summary.
Taiwanese Search Report for Application No. 104144170, dated Apr. 20, 2017.
CN Office Action for Application No. 201610044165.8, dated Jan. 31, 2019, w/ First Office Action Summary.
CN Search Report for Application No. 201610044165.8 dated Jan. 31, 2019, w/ First Office Action.

* cited by examiner

Primary Examiner — George C Neurauter, Jr.
(74) Attorney, Agent, or Firm — Nixon Peabody LLP; Zhou Lu

(57) ABSTRACT

A device, such as a baseboard management controller, monitors a physical-layer device in a server and at least one network connector/cable connected to the physical-layer device, determines a status of the physical-layer device or a status of the at least one network connector/cable indicates at least one of a warning or a failure, and transmits an alert corresponding to the at least one of the warning or the failure to a rack management controller.

17 Claims, 6 Drawing Sheets

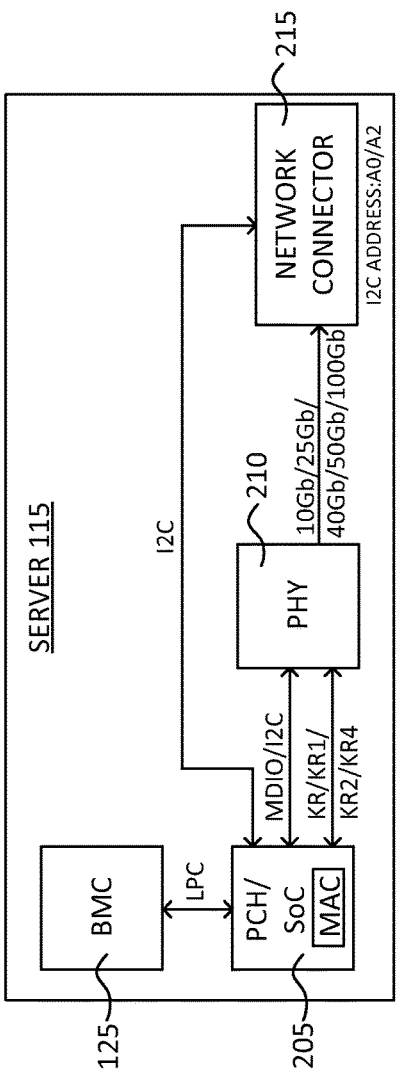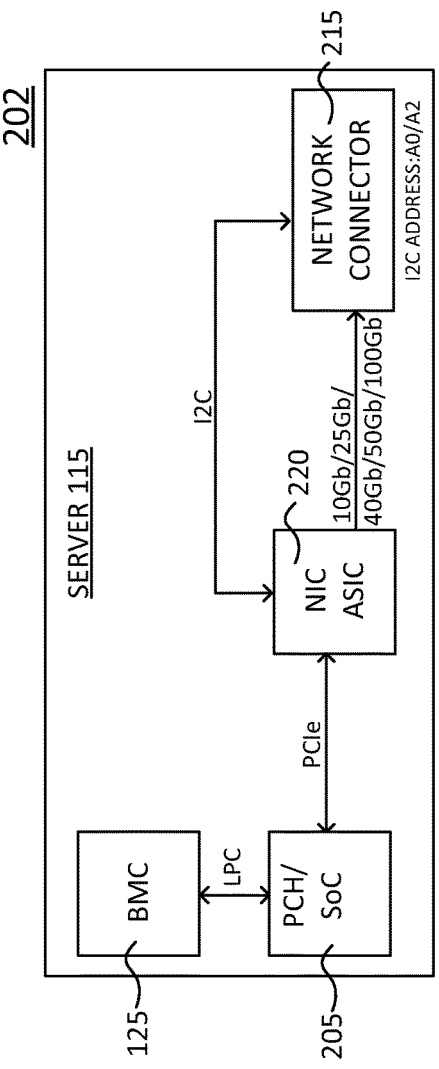

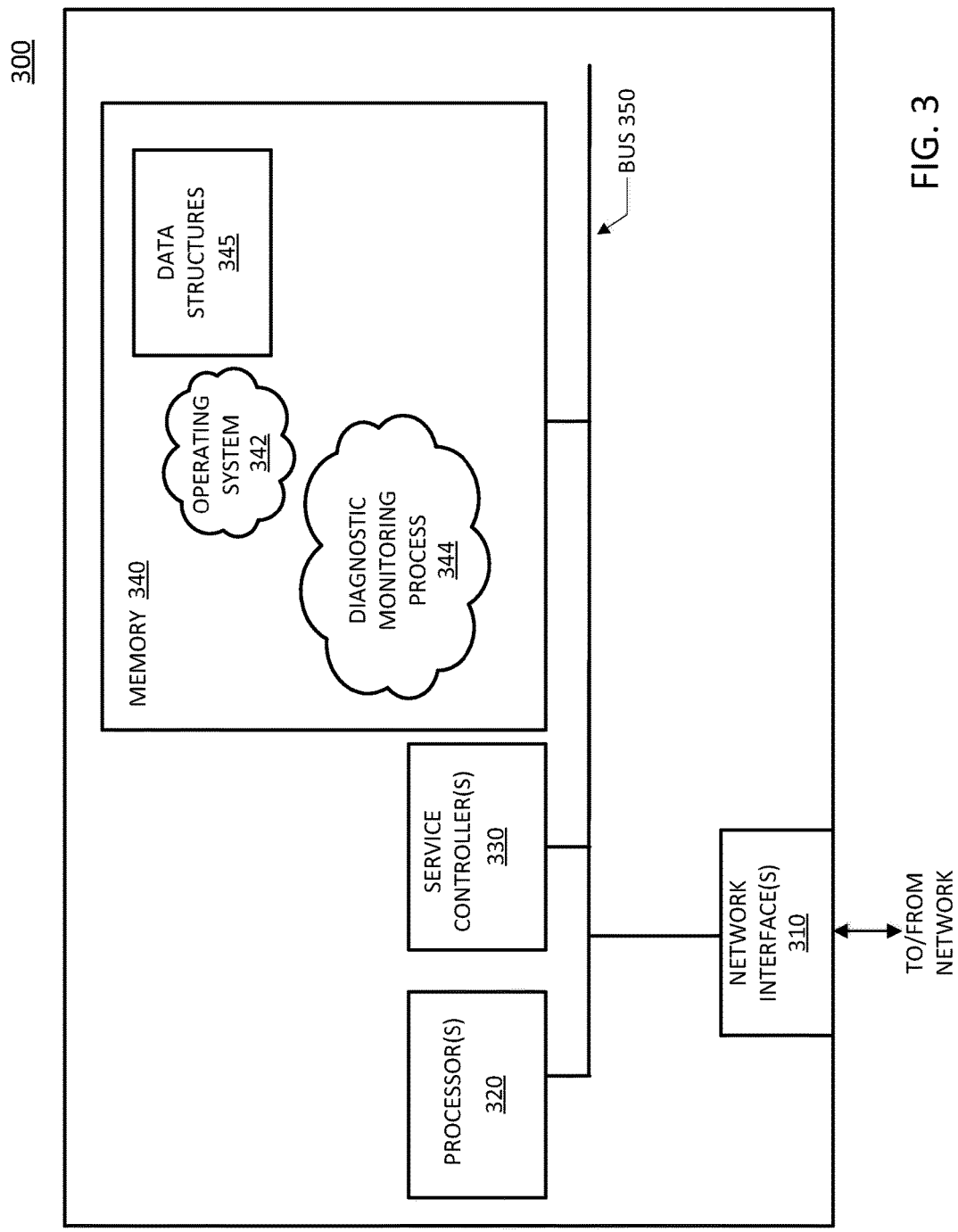

DIAGNOSTIC MONITORING TECHNIQUES FOR SERVER SYSTEMS

TECHNICAL FIELD

The present disclosure relates generally to network systems, including server systems, and more particularly, to improved server system diagnostics and monitoring.

BACKGROUND

An ever increasing demand for network services such as cloud-based computing services reflects an industry shift for businesses and consumers alike to store, manage, or otherwise access large amounts of data on remote servers. The remote servers typically reside in one or more data centers, which can house hundreds or even thousands of remote servers, including corresponding hardware and software components. The sheer number of hardware and software components as well as the number of possible configurations often results in a complex network of devices within each data center. Accordingly, it is often difficult to quickly and efficiently identify and troubleshoot root causes for errors or failures for such complex networks of devices.

SUMMARY

According to one or more implementations of this disclosure, diagnostic techniques are described herein. In one example, the diagnostic techniques provide new network interface configurations for computing devices such as servers housed in a data center. The diagnostic techniques further employ service controllers for corresponding servers to monitor network conditions, including for example, parameters related to physical-layer devices, network connectivity for the network interfaces, and the like, over the new network interface configurations. In this fashion, the diagnostic techniques efficiently measure various server conditions and can quickly identify potential network problems, including errors, failures, and the like.

For example, according to other implementations of this disclosure, a server includes a service controller such as a baseboard management controller (BMC) operable to monitor a physical-layer (PHY) device in the server and at least one network connector/cable connected to the PHY device. Generally, the PHY device exchanges data between at least one Media Access Controller (MAC) and the least one network connector/cable. In this fashion, the PHY device can be independent from a Platform Controller Hub (PCH), and the PCH can include an embedded MAC circuitry/device. The BMC may further determine a status of the PHY device or a status of the at least one network connector/cable indicates at least one of a warning or a failure, and transmit an alert corresponding to the at least one of the warning or the failure to a rack management controller (RMC). The RMC can collect such alerts from each BMC of corresponding servers in a server rack and further provide the alerts to a remote administrator over a communication network.

Notably, in some example implementations, the BMC monitors network parameters corresponding to the PHY device and the at least one network connector/cable over an Inter-Integrated Circuit (I2C) communication channel.

In other implementations, the BMC can initialize the PHY device in at least one of Ethernet 10GBASE-KR/25GBASE-KR1/50GBASE-KR2/40GBASE-KR4/100GBASE-KR4 modes over an Inter-Integrated Circuit (I2C) communication channel. Alternatively, or in addition, the BMC can also configure a network interface between the PHY device and the at least one MAC using a backplane auto-negotiation protocol. Again, the network interface may be configured to operate in at least one of Ethernet 10GBASE-KR/25GBASE-KR1/50GBASE-KR2/40GBASE-KR4/100GBASE-KR4 modes.

In additional implementations, when BMC determines the status of the PHY device or the status of the at least one network connector/cable, the BMC monitors one or more network parameters corresponding to the PHY device or the at least one network connector/cable. In such implementations, the BMC may also receive threshold conditions (e.g., from the RMC) defining warnings, failures, errors, and the like. The BMC can compare the network parameters to the threshold conditions to determine the status and subsequently transmit alerts accordingly.

Details of one or more implementations are set forth in the accompanying drawings and the description below. Other features, aspects, and potential advantages will be apparent from the description and drawings, and from the claims.

BRIEF DESCRIPTION OF THE DRAWINGS

The examples and example implementations herein may be better understood by referring to the following description in conjunction with the accompanying drawings in which like reference numerals indicate identical or functionally similar elements. Understanding that these drawings depict only exemplary implementations of the disclosure and are not therefore to be considered to be limiting of its scope, the principles herein are described and explained with additional specificity and detail through the use of the accompanying drawings in which:

FIGS. 2A and 2B are schematic block diagrams of conventional server configurations;

FIG. 3 is a schematic block diagram of an example network device;

DETAILED DESCRIPTION

Various examples of the disclosure are discussed in detail below. While specific implementations are discussed, it should be understood that this is done for illustration purposes only. A person skilled in the relevant art will recognize that other components and configurations may be used without parting from the spirit and scope of the disclosure.

As discussed above, a data center may house hundreds or even thousands of servers or server systems, including various hardware and software components (e.g., microprocessors, switches, routers, storage devices, storage adapters, memory modules, power supplies, fans, etc.). These servers (and hardware/software components) are often configured to form complex networks (e.g., a backbone for the Internet, etc.) and can support various applications and/or platforms (e.g., web servers, mail servers, database servers, etc.). Typically, in each data center, multiple servers are housed in one or more physical housings or racks, often referred to as a "server rack".

Figure 1:
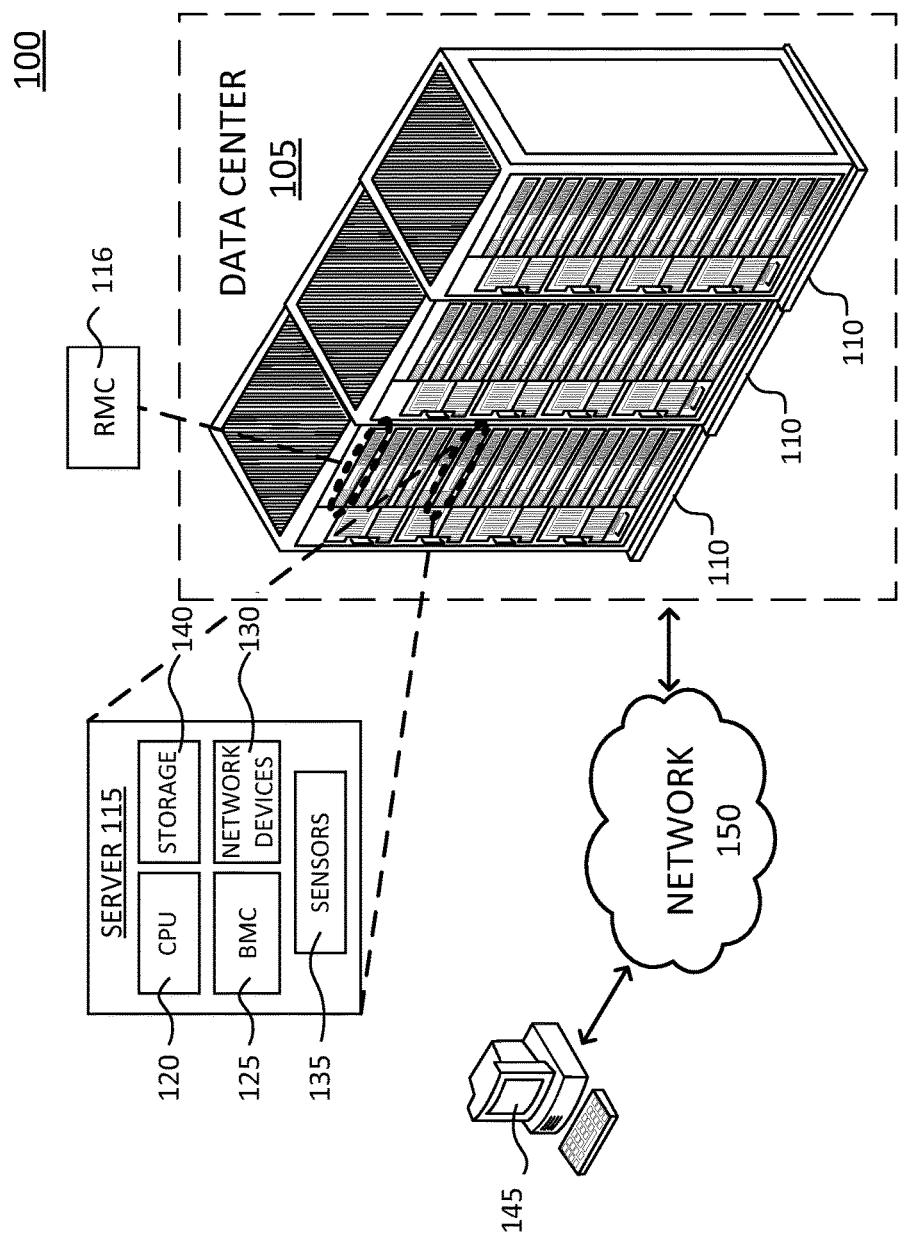
FIG. 1 is an example schematic diagram of a data center.

For example, FIG. 1 is an example schematic diagram 100 of a data canter 105 that includes multiple server racks 110, with each server rack 110 includes one or more servers such as a server 115. As shown, the servers in a corresponding server rack 110 are typically managed by a Rack Management Controller (RMC) 116 (e.g., in a server network). Further, RMC 116 can include an independent server or control device in server rack 110.

Server 115 particularly includes various components, such as one or more central processing units (CPU) 120, service microcontroller modules or devices, including a baseboard management controller (BMC) 125 and one or more network devices 130 (e.g., e.g. PCIe add-on card, a PCI Mezzanine Card, etc.), sensors 135, and a hardware storage 140. It is appreciated that the views of server 115 are for purposes of illustration and discussion, not limitation, and further, various other hardware and/or software components (not shown) may be included or excluded as is appreciated by those skilled in the art.

CPU 120 can include multiple cores and may operate as a main processor for server 115. Further, BMC 125 and/or network devices 130 may operate independent of CPU 120, as discussed herein. For example, BMC 125 can independently communicate with specific server hardware such as sensors 135 and monitor certain server conditions or parameters. Network devices 130 can also operate independent of CPU 120 and may communicate BMC 125.

BMC 125 can operatively include a specialized microcontroller (microprocessor) embedded on a motherboard of a corresponding server—here, server 115—and manage various server operations as well as monitor server health. For example, BMC 125 can provide an interface between system management software and platform hardware. As discussed herein, the term interface may refer to a communication channel or communication medium, as is appreciated by those skilled in the art.

Further, BMC 125 may form part of an intelligent platform management interface (IPMI), which refers to an industry standard for system monitoring and event recovery that defines a common message-based interface for accessing manageable features in a server. IPMI particularly includes predefined commands for reading temperature, voltage, fan speed, chassis intrusion, and other parameters. System event logs, hardware watchdogs, and power control can also be accessed through IPMI, and supported by BMC 125. Typically, a server host transfers IPMI messages to a BMC through Low Pin Count (LPC) bus, and some device channels are created on the LPC bus for this purpose (e.g., a Keyboard Controller Style (KCS) interface, a Block Transfer (BT) interface, etc.). BMC 125 can host such IMPI status monitoring and control maintenance functions (e.g., power cycling, issuing alerts, etc.). Moreover, BMC 125 can support other functions, including, for example, SuperIO, Serial over LAN (SOL). System Basic Input/Output System (BIOS) maintenance, Video Graphics (e.g., a Video Graphics Adapter (VGA) may be embedded in BMC 125 for display output), and also remote management.

With respect to remote management, it is appreciated that administration (e.g., monitoring, maintenance, etc.) for data centers is often rendered difficult by the sheer number of systems and components. Accordingly, BMC 125 can support remote management for corresponding servers for an administrator over a network. Notably, BMC 125 typically operates in conjunction with RMC 116 to support remote management by one or more administrators. As shown, remote management is supported for an administrator 145 over a network 150. Administrator 145 typically communicate with RMC 116 and/or BMC 125 over network 150 using, for example, a Remote Management Control Protocol (RMCP). In this fashion, RMC 116 and/or BMC 125 can receive commands and/or requests for data or status for a corresponding server 115 over network 150, and/or monitor sensors 135 (or other components) and send alerts to administrator 145 over network 150 (e.g., when monitored parameters exceed preset limits, etc.).

FIGS. 2A and 2B are schematic block diagrams of conventional server configurations 201 and 202, respectively, for server 115.

As shown, server configuration 201 includes BMC 125 coupled to a Platform Controller Hub (PCH) 205 (included in a System on Chip (SoC) implementation) over a through Low Pin Count (LPC) bus or interface.

PCH 205 includes embedded link-layer circuitry, referred to as a Media Access Controller (MAC). As is appreciated by those skilled in the art, MAC or MAC device refers to electronic circuitry and/or software modules that control access to and communications on for a network medium or network interface. PCH 205 also connects to an external physical-layer (PHY) device 210 (e.g., a transceiver, etc.) over a Management Data Input/Output (MDIO) interface (e.g., sometimes referred to as a Serial Management Interface (SMI) or Media Independent Interface Management (MIIM)), as well as an KR/KR1/KR2/KR4 interface (e.g., which refers to Ethernet standards). In turn, PHY device 210 connects to network connector 215 over a large bandwidth Ethernet-based interface (e.g., to support server data communications). Notably, in server configuration 201 PHY device 210 is an external device that exchanges data between PCH 205 and network connector 215. Further, as used herein, the term "network connector" and reference to network connectors such as network connector 215, may include a connector, a network cable, and/or circuitry supporting the same.

Significantly, as shown, PCH 205 also connects to a network connector 215 over an inter-integrated circuit (I2C) interface or communication channel. The I2C interface supports cable diagnostic protocols as is appreciated by those skilled in the art (e.g., SFF-8472, which provides I2C EEPROM addresses (A0,A2) on an optical transceiver for diagnostics).

Server configuration 202, like server configuration 201, provides an LPC interface between BMC 125 and PCH 205. However, rather than embedded MAC circuitry and an independent PHY device 210 (shown in configuration 201), server configuration 202 employs a Network Interface Controller (NIC)/Application-Specific Integrated Circuit (ASIC) device 220 to communicate data. Thus, PCH 205 connects to NIC ASIC 220 over a single Peripheral Component Interconnect Express (PCIe) interface. NIC ASIC 220, like PHY device 210, connects to network connector 215 over an Ethernet-based interface. Moreover, NIC ASIC 220 further connects to network connector 215 an I2C interface.

Collectively, conventional server configurations 201 and 202 limit diagnostic monitoring amongst various hardware/software components in server 115. Specifically, BMC 125 only connects to PCH 205 over the LPC interface, which limits network monitoring functions of BMC 125. As a result, when potential network problems arise in server 115 a root cause or a source of such potential network problems may be attributed to any number of the devices. Diagnostics such as identifying the root cause of a potential network problem is further exacerbated and multiplied by the large number of servers, system, and components in a data center.

FIG. 3 is a schematic block diagram of an example network device 300 that may be used to employ the diagnostic monitoring techniques described herein. For example, device 300 can include any electronic device such as a server, computer, a smart phone, tablet, other electronic devices, etc. Device 300 may include one or more network interfaces 310 (e.g., wired, wireless, LPC, MDIO, I2C, Ethernet based, etc.), at least one processor 320, at least one service controller 330, and a memory 340, each of which may be interconnected by at least one bus 350.

Network interfaces 310 contain the mechanical, electrical, and signaling circuitry for communicating data over various media. Network interfaces 310 may be configured to transmit and/or receive data using a variety of different communication protocols. Memory 340 includes a plurality of storage locations addressable by processor 320, service controller 330, and/or the network interfaces 310. Memory 340 stores software programs and data structures 345 associated with the examples described herein. Note that certain devices may have limited memory or no memory (e.g., no memory for storage other than for programs/processes operating on the device and associated caches).

Processor 320 and/or service controller 330 may include hardware elements or hardware logic adapted to execute the software programs and manipulate the data structures 345. An operating system 342, portions of which are typically resident in memory 340 and executed by processor 320/service controller 330, functionally organizes the device by, inter alia, invoking operations in support of software processes and/or services executing on the device. These software processes and/or services may include diagnostic monitoring process/services 344. While process/services 344 are shown in centralized memory 340, alternative exemplary implementations provide for process/services 344 to be operated within network interfaces 310 (e.g., by PHY and/or MAC circuitry or devices).

It will be apparent to those skilled in the art that other processor and memory types, including various computer-readable media, may be used to store and execute program instructions pertaining to the diagnostic techniques described herein. Also, while this disclosure illustrates various processes, it is expressly contemplated that various processes may be embodied as modules configured to operate in accordance with the techniques herein (e.g., according to the functionality of a similar process). Further, while some processes may be shown or discussed as separate, those skilled in the art will appreciate that processes may be routines or modules within other processes. Illustratively, the techniques described herein may be performed by hardware, software, and/or firmware, such as in accordance with the diagnostic monitoring process 344, which may contain computer executable instructions executed by processor 320 and/or service controller 330 (or independent processor of interfaces 310) to perform functions relating to the techniques described herein.

Figure 4:
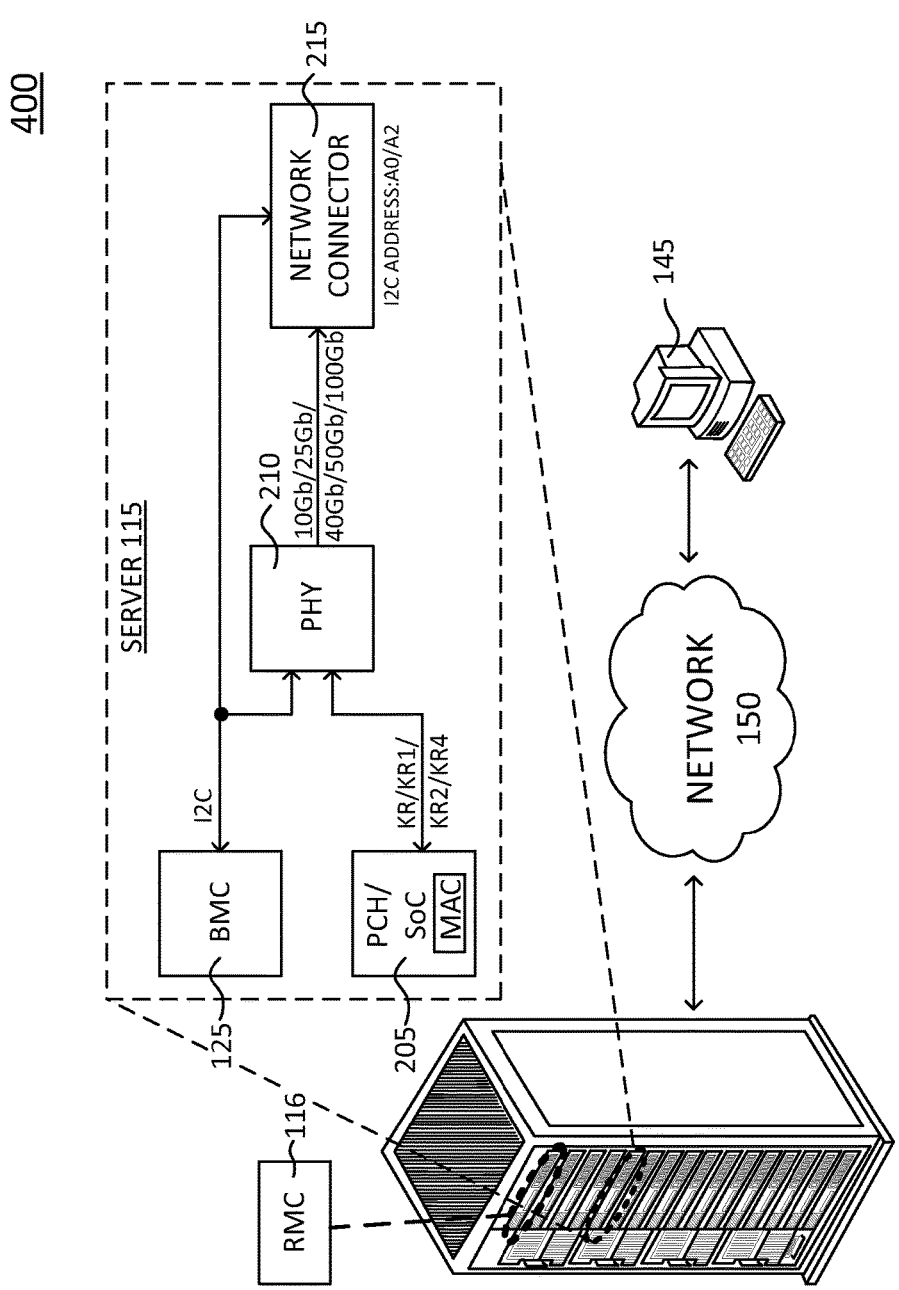
FIG. 4 is a schematic block diagram of a new server configuration.

FIG. 4 is an example schematic block diagram of a new server configuration 400, which supports the diagnostic monitoring techniques disclosed herein (e.g., diagnostic monitoring process 344). As discussed above, conventional server configurations 201 and 202 limit diagnostic monitoring in corresponding servers. However, it is also appreciated that modern servers increasingly employ server configurations similar to that shown in FIG. 2A, e.g., including a PCH with embedded MAC circuitry/software as well as an external PHY device to handles server or network traffic.

Here, new server configuration 400 provides an I2C network interface connecting BMC 125, PHY device 210, and network connector 215. In this new server configuration 400, BMC 125 can perform diagnostic monitoring for each of PHY device 210 and network connector 215 to detect potential network problems in server 115. In this fashion, BMC 125 can quickly identify root causes of potential network issues and report such network issues to an administrator—here, BMC 125 reports to administrator 145 over network 150. In addition to the I2C interface, new server configuration 400 also configures an interface between PCH 205 (e.g., MAC circuitry) and PHY 210 as an Ethernet interface (e.g., KR/KR1/KR2/KR4, etc.).

Operatively, new server configuration 400 supports additional BMC diagnostic functionality. Specifically, BMC 125 can control and monitor PHY device 210 and network connector 125 over the I2C interface in new server configuration 400. In addition, BMC 125 can also receive and/or define threshold conditions and compare monitored network parameters against such threshold conditions to determine potential network issues, errors, failures, and the like. In some implementations, BMC 125 can further modify such threshold conditions (e.g., based on an update from administrator 145, based on an update from RMC 116, based on historical server conditions, etc.). Preferably, BMC 125 sends monitored network parameters, including warnings, failures, errors, and the like, to RMC 116. In turn, RMC 116 can provide management tools for administrator 145 to troubleshoot potential network issues over network 150 in a simple efficient manner.

Figure 5:
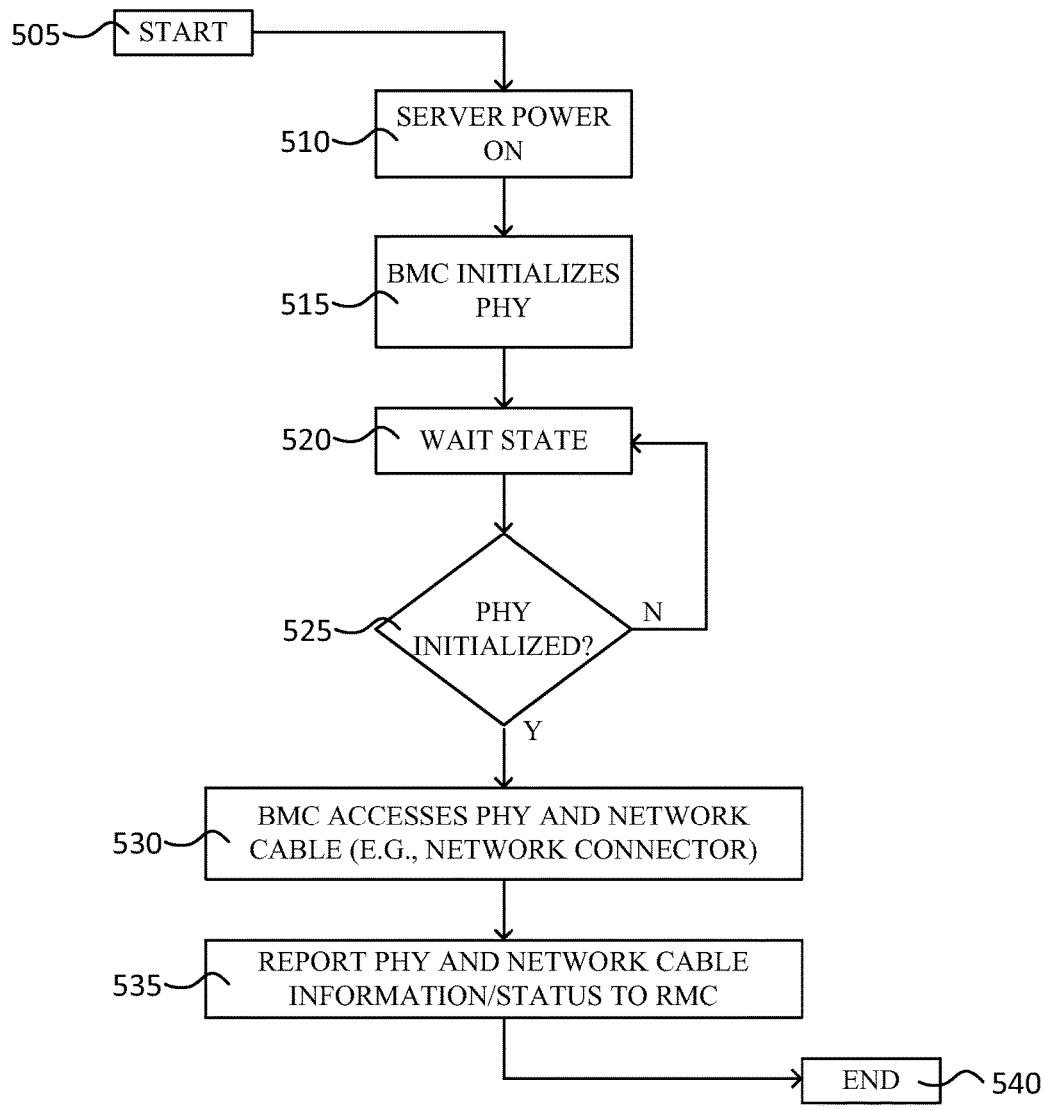
FIG. 5 is an example simplified procedure for diagnostic monitoring in a server system, particularly employed one or more devices in the new server configuration shown in FIG. 4.

FIG. 5 is an example simplified procedure 500 for diagnostic monitoring in a server system, particularly employed one or more devices (e.g., BMC 125 and/or RMC 116) using the new server configuration 400.

FIG. 5 begins at step 505 and proceeds to step 510 where a server (e.g., server 115) is powered on. Once powered on, a BMC in the server (e.g., BMC 125) initializes, in step 515, a PHY device (e.g., PHY device 210). For example, the BMC can initialize the PHY device using, for example, the I2C interface shown in new server configuration 400.

In steps 520 and 525, procedure 500 waits for the PHY device to be initialized, and then proceeds to step 530, where, as discussed in greater detail above, the BMC can access the PHY device and/or a network connector/cable. For example, the BMC can monitor the PHY device, as well as the network connector/cable for various network conditions and perform one or more diagnostic procedures discussed above.

Procedure 500 continues to step 535 where the BMC reports information (e.g., status) for the PHY device and network connector/cable information to a Rack Management Controller (RMC). Typically, the RMC can collect and/or aggregate the reports from each BMC corresponding to respective servers in a server rack. Further, as discussed above, the RMC (in conjunction with the BMC) can provide management tools to an administrator over a communication network (e.g., network 150). These management tools can be sued to monitor, identify, and trouble shoot potential network issues simply and efficiently.

Procedure 500 subsequently ends in step 540, but may continue on to initialize the PHY device (step 515) and/or monitor the PHY device and/or network connector/cable (step 530).

Figure 6:
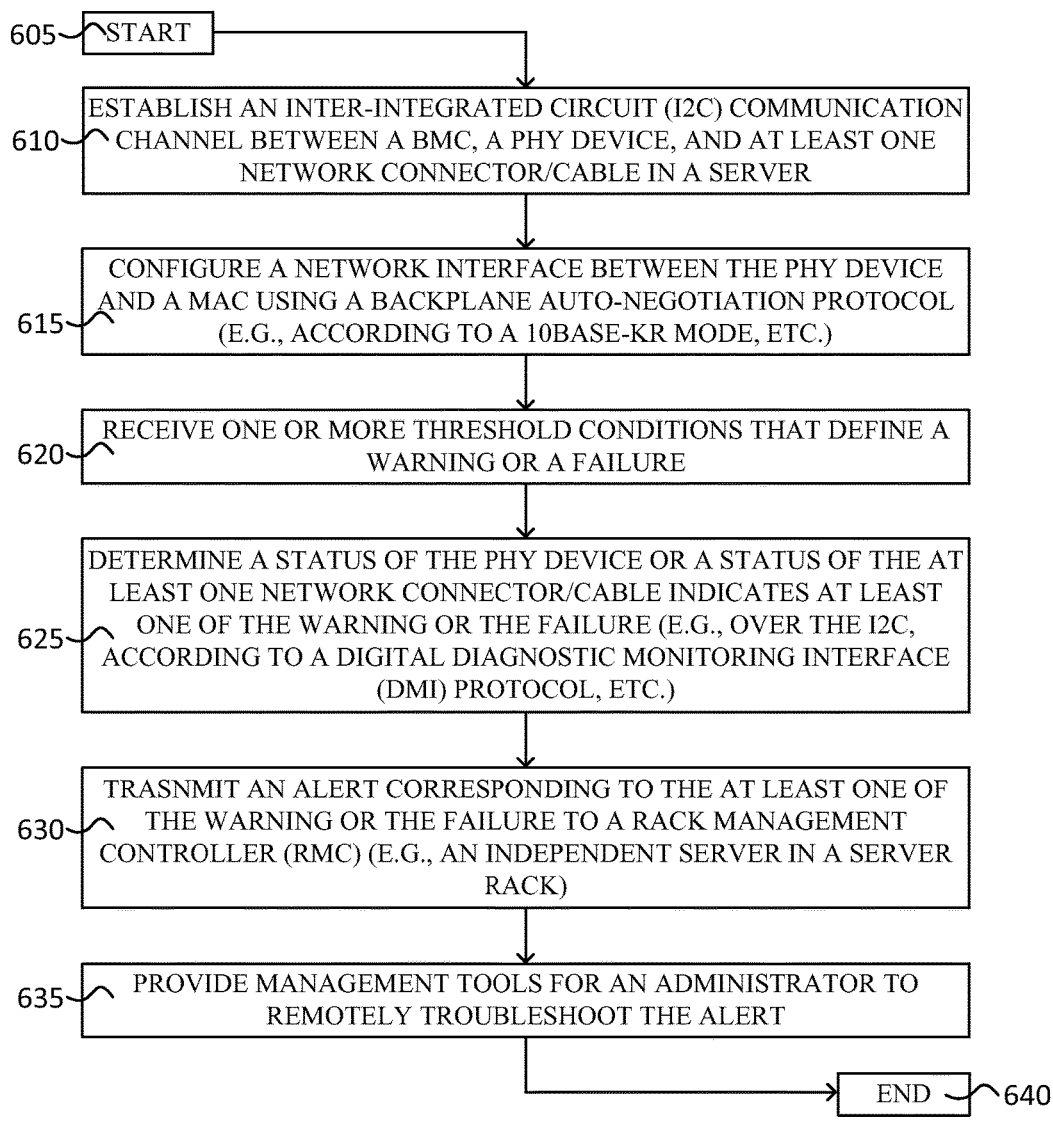
FIG. 6 is another example simplified procedure for diagnostic monitoring in a server system.

FIG. 6 is another example simplified procedure 600 for diagnostic monitoring in a server system.

Procedure 600 begins at step 605 and continues to step 610 where, as discussed in greater detail above, an Inter-Integrated Circuit (I2C) communication channel is established between a BMC, a PHY device, and at least one network connector in a server. For example, such I2C communication channel is shown in new server configuration 400.

Procedure 600 continues to step 615 where the BMC configures or otherwise initializes a network interface between the PHY device and a Media access controller (MAC). Preferably, the BMC configures the network interface as an Ethernet interface such as one of 10GBASE-KR/25GBASE-KR1/50GBASE-KR2/40GBASE-KR4/100GBASE-KR4 modes. In addition, the BMC may use a backplane auto-negotiation protocol to perform such configuration or initialization.

The BMC may further receive one or more threshold conditions that define warnings, failures, errors, and the like, shown in step 620. For example, a Rack Management Controller (RMC) (e.g., RMC 116) may send such threshold conditions to each BMC for corresponding servers in the server rack. Each BMC may further monitor a status of the PHY device or the network connector/cable and determine, in step 625, such status indicates a particular network condition such as a warning, failure, error, etc. For example, the BMC may monitor parameters corresponding to the status for the PHY device and/or the network connector/cable and compare such parameters to the threshold conditions to determine if the network condition exists. Preferably, the BMC monitors the parameters for the PHY device and the network connector/cable over the I2C communication channel. In some implementations, the BMC may employ a Digital Diagnostic Monitoring Interface (DMI) protocol such as that specified by SFF-8472. Moreover, the RMC may provide updated threshold conditions to the BMC for subsequent monitoring.

The BMC may further transmit an alert, in step 630, to the RMC indicating the warning, failure, error, etc., occurred for the PHY device or network connector/cable in the server. Further, as discussed above, the RMC may further provide the alert to a remote administrator using various management tools, in step 635. These management tools may further assist the network administrator identify, troubleshoot, and address potential network issues.

Procedure subsequently ends in step 640, but may return to step 625 where the BMC monitors and determines the status of the PHY device or the network connector/cable.

It should be noted that while certain steps within procedures 500 and 600 may be optional, and further, the steps shown in FIGS. 5 and 6 are merely examples for illustration. Certain other steps may be included or excluded as desired. Further, while a particular order of the steps is shown, this ordering is merely illustrative, and any suitable arrangement of the steps may be utilized without departing from the scope of the examples and/or example implementations herein. Moreover, while procedures 500-600 are described separately, certain steps from each procedure may be incorporated into each other procedure, and the procedures are not meant to be mutually exclusive.

The techniques described herein, therefore, provide for improved diagnostic monitoring in data centers, particularly employed by service controllers (BMCs) over inter-integrated circuit (I2C) interfaces or communication channels in corresponding servers. These improved diagnostic monitoring techniques particularly provide new hardware and software configurations that take advantage of independent PHY device implementations in servers. In the aggregate, the improved diagnostic monitoring techniques provide administrators valuable information related to specific hardware devices as well as software modules for each server in a data center and facilitate efficient root cause analysis of potential network problems.

While there have been shown and described illustrative examples and example implementations of diagnostic monitoring using specific processors, service controllers, and the like, it is to be understood that various other adaptations and modifications may be made within the spirit and scope of the example and example implementations herein. For example, the examples have been shown and described herein with relation to a specific service controller (e.g., a BMC) in a corresponding server. However, the examples in their broader sense are not as limited, and may, in fact, be used with any number of devices, controllers, processors, and the like.

The foregoing description has been directed to specific examples and exemplary implementations. It will be apparent, however, that other variations and modifications may be made to the described examples, with the attainment of some or all of their advantages. For instance, it is expressly contemplated that the components, steps, and/or processes for a particular implementation may be interchangeably included (or even excluded) from other implementations without deviating from the scope of this disclosure. Moreover, various components and/or elements described herein can be implemented as software being stored on a tangible (non-transitory) computer-readable medium, devices, and memories (e.g., disks/CDs/RAM/EEPROM/etc.) having program instructions executing on a computer, hardware, firmware, or a combination thereof. Further, methods describing the various functions and techniques described herein can be implemented using computer-executable instructions that are stored or otherwise available from computer readable media. Such instructions can include, for example, instructions and data which cause or otherwise configure a general purpose computer, special purpose computer, or special purpose processing device to perform a certain function or group of functions. Portions of computer resources used can be accessible over a network. The computer executable instructions may be, for example, binaries, intermediate format instructions such as assembly language, firmware, or source code. Examples of computer-readable media that may be used to store instructions, information used, and/or information created during methods according to described examples include magnetic or optical disks, flash memory, USB devices provided with non-volatile memory, networked storage devices, and so on. In addition, devices implementing methods according to these disclosures can include hardware, firmware and/or software, and can take any of a variety of form factors. Typical examples of such form factors include laptops, smart phones, small form factor personal computers, personal digital assistants, and so on. Functionality described herein also can be embodied in peripherals or add-in cards. Such functionality can also be implemented on a circuit board among different chips or different processes executing in a single device, by way of further example. Instructions, media for conveying such instructions, computing resources for executing them, and other structures for supporting such computing resources are means for providing the functions described in these disclosures. Accordingly this description is to be taken only by way of example and not to otherwise limit the scope of the examples herein. Therefore, it is the object of the appended claims to cover all such variations and modifications as come within the true spirit and scope of the examples herein.

The invention claimed is:

1. A method, comprising:
monitoring, by a baseboard management controller, a physical-layer device in a server and at least one network connector/cable connected to the physical-layer device, wherein the physical-layer device exchanges data between at least one media access controller and the least one network connector/cable;
determining, by the baseboard management controller, a status of the physical-layer device or a status of the at least one network connector/cable indicates at least one of a warning or a failure;
transmitting, by the baseboard management controller, an alert corresponding to the at least one of the warning or the failure to a rack management controller; and
providing, by the rack management controller, management tools over a communication network for an administrator to remotely troubleshoot the alert.

2. The method of claim 1, further comprising:
initializing, by the baseboard management controller, the physical-layer device over an inter-integrated circuit communication channel to communicate with the at least one media access controller in at least one of Ethernet 10GBASE-KR/25GBASE-KR1/50GBASE-KR2/40GBASE-KR4/100GBASE-KR4 modes.

3. The method of claim 1, further comprising:
configuring a network interface between the physical-layer device and the at least one media access controller using a backplane auto-negotiation protocol.

4. The method of claim 3, wherein configuring the network interface further comprises configuring the network interface between the physical-layer device and the at least one media access controller as at least one of Ethernet 10GBASE-KR/25GBASE-KR1/50GBASE-KR2/40GBASE-KR4/100GBASE-KR4 modes.

5. The method of claim 1, further comprising:
establishing an inter-integrated circuit communication channel between the baseboard management controller, the physical-layer device, and the at least one network connector/cable, and
wherein determining the status comprises determining the status of the physical-layer device or the status of the at least one network connector/cable over the inter-integrated circuit communication channel.

6. The method of claim 1, wherein determining the status comprises determining the status of the physical-layer device or the status of the at least one connector/cable using a digital diagnostic monitoring interface protocol.

7. The method of claim 6, further comprising:
receiving, by the baseboard management controller, one or more updated threshold conditions from the rack management controller to redefine the warning and the failure; and
wherein determining one or more network parameters corresponding to the status of the physical-layer device or the status of the network connector/cable further comprises determining one or more network parameters corresponding to the status of the physical-layer device or the status of the network connector/cable exceed the one or more updated threshold conditions.

8. The method of claim 1, further comprising:
receiving, by the baseboard management controller, one or more threshold conditions that define the warning and the failure, and
wherein determining the status further comprises determining one or more network parameters corresponding to the status of the physical-layer device or the status of the network connector/cable exceed the one or more threshold conditions.

9. The method of claim 1, wherein the server is a first server and the rack management controller is a second server housed in a shared server rack.

10. A service controller device, comprising:
one or more network interfaces to communicate with at least one other device in a server;
a processor coupled to the network interfaces and adapted to execute one or more processes; and
a memory configured to store instructions executable by the processor, the instructions, when executed by the processor, cause the processor to perform operations comprising:
monitor a physical-layer device in the server and at least one network connector/cable connected to the physical-layer device, wherein the physical-layer device exchanges data between at least one media access controller and the least one network connector/cable;
determine a status of the physical-layer device or a status of the at least one network connector/cable indicates at least one of a warning or a failure;
transmit an alert corresponding to the at least one of the warning or the failure to a rack management controller; and
configure a network interface between the physical-layer device and the at least one media access controller using a backplane auto-negotiation protocol.

11. The service controller device of claim 10, wherein the instructions further cause the processor to perform operations comprising:
initialize the physical-layer device in at least one of Ethernet 10GBASE-KR/25GBASE-KR1/50GBASE-KR2/40GBASE-KR4/100GBASE-KR4 modes over an inter-integrated circuit communication channel.

12. The service controller device of claim 10, wherein the instructions further cause the processor to perform operations comprising:
configure the network interface between the physical-layer device and the at least one media access controller as at least one of Ethernet 10GBASE-KR/25GBASE-KR1/50GBASE-KR2/40GBASE-KR4/100GBASE-KR4 modes.

13. The service controller device of claim 10, wherein the one or more network interfaces comprises an inter-integrated circuit communication channel that communicates data from the service controller device to the physical-layer device and the at least one network connector/cable.

14. The service controller device of claim 13, wherein the operations to determine the status of the physical-layer device or the status of the at least one network connector/cable, further comprise:
determine the status of the physical-layer device or the status of the at least one network connector/cable over the inter-integrated circuit communication channel.

15. A tangible, non-transitory, computer-readable media having software encoded thereon, the software, when executed by a processor, causes the processor to perform operations comprising:
monitor a physical-layer device in the server and at least one network connector/cable connected to the physical-layer device, wherein the physical-layer device exchanges data between at least one media access controller and the least one network connector/cable;

determine a status of the physical-layer device or a status of the at least one network connector/cable indicates at least one of a warning or a failure;

transmit an alert corresponding to the at least one of the warning or the failure to a rack management controller; and initialize the physical-layer device in at least one of Ethernet 10GBASE-KR/25GBASE-KR1/50GBASE-KR2/40GBASE-KR4/100GBASE-KR4 modes over an inter-integrated circuit communication channel.

16. The tangible, non-transitory, computer-readable media of claim 15, wherein operations further comprise:
configure a network interface between the physical-layer device and the at least one media access controller using a backplane auto-negotiation protocol.

17. The tangible, non-transitory, computer-readable media of claim 16, wherein operations to configure the network interface, further comprise:
configure the network interface between the physical-layer device and the at least one media access controller as at least one of Ethernet 10GBASE-KR/25GBASE-KR1/50GBASE-KR2/40GBASE-KR4/100GBASE-KR4 mode.

* * * * *